United States Patent [19]

Matsuda

[11] 4,321,352

[45] Mar. 23, 1982

[54] PROCESS FOR PRODUCTION OF METAL-CONTAINING IONIC CURED RUBBERS

[75] Inventor: Hideaki Matsuda, Marugame, Japan

[73] Assignee: Okura Kogyo Kabushiki Kaisha, Japan

[21] Appl. No.: 191,688

[22] Filed: Sep. 29, 1980

[30] Foreign Application Priority Data

Oct. 8, 1979 [JP] Japan .................. 54/128887

[51] Int. Cl.³ .......................................... C08C 19/36
[52] U.S. Cl. .................................... 528/115; 525/333; 525/334; 525/383; 525/385; 528/361; 528/365
[58] Field of Search ............... 525/333, 334, 383, 385; 528/115, 361, 365

[56] References Cited

U.S. PATENT DOCUMENTS

| | | | |
|---|---|---|---|
| 3,208,980 | 9/1965 | Gruver et al. | 525/385 X |
| 3,324,198 | 6/1967 | Gruver | 525/385 X |
| 3,902,935 | 9/1975 | Wall et al. | 528/365 X |
| 4,158,727 | 6/1979 | Matsuda | 528/365 X |

*Primary Examiner*—Earl A. Nielsen
*Attorney, Agent, or Firm*—Jacobs & Jacobs

[57] ABSTRACT

Novel metal-containing ionic cured rubbers are obtained by reacting a partially neutralized liquid rubber which has been obtained by partial neutralization, with metal ion, of carboxyl-terminated liquid elastomerizable polymers, with bisepoxide and dibasic acid anhydride.

7 Claims, No Drawings

PROCESS FOR PRODUCTION OF METAL-CONTAINING IONIC CURED RUBBERS

BACKGROUND OF THE INVENTION (1) Field of the Invention

This invention relates to a process for production of ionic metal-containing cured rubbers (i.e., metal-containing cured rubbers which have ionic bonds in their molecules). More particularly, it relates to a process for producing the ionic cured rubbers which comprises reacting a liquid rubber having terminal carboxyl groups which have been partially neutralized with metal ions with a bisepoxide and a dibasic acid anhydride. The invention can be advantageously applied to the industrial fields where conventional liquid rubbers have been cured into solid elastomers.

(2) Description of the Prior Art

Heretofore, introduction of ionic bonds into rubber polymers has been carried out by preparing first a rubber having functional groups capable of forming ionic bond, such as carboxyl groups, and then neutralizing the rubber with metal ions. This method, however, has difficulty in that the neutralization reaction does not sufficiently proceed and the unreacted metal ion-forming agent is difficult to be removed. Presence of the unreacted metal ion-forming agent may often result in opaqueness of resulting rubber. Further, the neutralization reaction produces undesirable by-products such as water. Particularly, it is very difficult, according to this method, to effectively introduce ionic bonds into three-dimensional polymers.

The liquid rubbers to be used such as carboxyl-terminated polybutadienes and carboxyl-terminated butadiene-acrylonitrile copolymers are commercially available from the B. F. Goodrich Company, U.S.A. and sold under trade name "Hycar". The main uses of these liquid rubbers have been for sealants, moisture-resistant compounds, binders for rocket- or missile-propellents, encapsulation or potting in electric industry and the like.

The present inventor has paid attention to the fact that the liquid rubbers aforementioned have carboxyl groups at their both terminal positions, and has found that the rubber can be partially neutralized by adding thereto a polyvalent metal ion-forming agent. Furthermore, the present inventor has found that by adding, to the liquid rubber thus partially neutralized, a bisepoxide and a dibasic acid anhydride and then heating the resulting mixture, reaction proceeds in the absence of a catalyst to produce a metal-containing ionic cured rubber in one step. Thus, the present invention has been accomplished.

The object of the invention is to provide a process for producing a novel metal-containing ionic cured rubber from the above-mentioned liquid rubber in one step without using any catalyst.

Other objects of the invention will be made clear in the following description.

SUMMARY OF THE INVENTION

In accordance with the present invention, there is provided a process for producing a metal-containing cured rubber having ionic bonds therein, which comprises reacting a liquid rubber having terminal carboxyl groups which have been partially neutralized with metal ions with a bisepoxide and a dibasic acid anhydride to produce said rubber in one step without addition of a catalyst.

DETAILED DESCRIPTION OF THE INVENTION

More particularly, the process for producing a metal-containing cured rubber having ionic bonds in its molecules comprises reacting a liquid elastomerizable polymer having terminal carboxyl groups which have been partially neutralized with metal ions with a bisepoxide and a dibasic acid anhydride in the absence of a catalyst to produce said rubber in one step. By the term "liquid elastomerizable polymer" herein is meant a polymer which can be cured into a solid elastomer.

The carboxyl-terminated liquid elastomerizable polymers to be employed in the present process are not especially restricted provided that they have, on an average, two carboxyl groups at the terminal positions of their molecules. They may further contain carboxyl groups on their side chains in addition to the terminal carboxyl groups. Typical examples of such polymers include liquid elastomerizable polymers such as a carboxyl-terminated liquid polybutadiene, a carboxyl-terminated liquid butadiene-acrylonitrile copolymer and the above-mentioned carboxyl-terminated liquid polymer or copolymer having additional carboxyl group on its side chain. Commercially available products of these polymers include a series of "Hycar" (trade mark, supplied by The B. F. Goodrich Company, U.S.A.) such as Hycar CBT 2000x162, Hycar CTBN 1300x8 and Hycar CTBNX 1300x9, wherein the marks C, T, B, N and X attached to these trade marks have the following meanings:

C: carboxyl
T: terminal reactivity
B: butadiene
N: acrylonitrile
X: pendant reactivity (extra)

Main properties of the above-mentioned commercial products are given in Table 1 by reference.

Incidentally, the liquid rubbers of the above-defined type to be used in the present invention have a molecular weight of generally larger than about 500, preferably larger than about 1,000 and more preferably larger than about 2,000.

TABLE 1

|  | Hycar CTB 2000 × 162 | Hycar CTBN 1300 × 8 | Hycar CTBNX 1300 × 9 |
| --- | --- | --- | --- |
| Carboxyl (%) | 1.9 | 2.37 | 2.93 |
| Molecular weight | 4800 | 3500 | 3500 |
| Functionality | 2.01 | 1.85 | 2.3 |
| Acrylonitrile (%) | 0 | 18 | 18 |
| Specific gravity at 25° C. | 0.907 | 0.948 | 0.955 |

These polymers may be employed alone or as mixtures. The metal ions which can be employed to neutralize the terminal carboxyl groups of the liquid rubber are not especially restricted; however, divalent metal ions are usually employed to give better results. Such divalent metal ions are exemplified by alkaline earth metal ions and zinc family metal ions. Among these metal ions, $Mg^{++}$, $Ca^{++}$ and $Zn^{++}$ are preferred from the view point of environmental pollution problems. As compounds which provide these metal ions, the oxides or hydroxide thereof are preferred.

Partial neutralization, with the metal ions, of the terminal carboxyl groups of the liquid rubber is readily carried out, although it is very difficult to neutralize them completely. Such partial neutralization can be effectively attained by the following manner: a predetermined amount of the liquid rubber and a metal ion-forming agent in an amount required to achieve a desired neutralization degree are mixed throughly under stirring in a reaction vessel at a temperature of from 50° to 200° C., preferably from 100° to 150° C. Thus, the predetermined neutralization degree is readily achieved and a partially neutralized liquid rubber which can be used in the present invention can be obtained.

As the neutralization degree of the liquid rubber is lowered, ionic bonds contained in the resulting cured rubber is decreased. On the other hand, if the neutralization degree is increased too much the concentration of the unreacted carboxylic acids in the liquid rubber becomes too low. The neutralization degree is usually 5 to 60%, and preferably 25 to 50%. For example, when the neutralization degree is 50%, the liquid rubber may be represented by the following structure:

Furthermore, it should be noted that the present inventor has found that the metal carboxylate groups (ionic bonds) contained in the molecule of the liquid rubber exhibit an excellent catalytic activities in a variety of reactions, especially in an esterification reaction.

The bisepoxides to be employed in the present invention are not restricted provided that they have on an average two epoxy groups in the molecule. Typical examples thereof include bisphenol A diglycidylether, phthalic acid diglycidyl ester, hexahydrophthalic acid diglycidyl ester, and the like. Moreover, the bisepoxides may be partly replaced with an epoxy compound which contains three or more epoxy groups. Typical examples of such epoxy compounds include tris-2,3'-epoxypropyl-isocyanurate, glycerine triglycidyl ether and the like.

The dibasic acid anhydrides which are employed as a component of the curable composition of this invention are not especially restricted. Typical examples thereof include phthalic anhydride, maleic anhydride, hexahydrophthalic anhydride, succinic anhydride and the like. They may be used alone, or two or more of them may be concomitantly used.

In carrying out the curing reaction of this invention, the liquid rubber which has been partially neutralized as described above is first mixed with a bisepoxide and a dibasic acid anhydride to prepare a curable composition. In this step, the proportions of these components are not especially restricted. By changing the proportions of the components, the resulting cured products can be varied in the amounts of ionic bonds and terminal groups, and crosslinking density, and the like. With respect to the ratio of the dibasic acid anhydride to the liquid rubber the crosslinking density of the resultant cured product is lowered as the ratio is decreased; and the crosslinking density is increased as the ratio is increased. On the other hand, the proportion of the terminal hydroxyl group in the resultant cured product is increased as the ratio of the liquid rubber and the dibasic acid anhydride to the bisepoxide is decreased; and the proportion of the terminal carboxyl group is increased when the ratio becomes too much. The cured products having excellent properties are generally obtained when the molar ratio of the liquid rubber to the dibasic acid anhydride is in the range of from 1:5 to 1:40 and the total of the number of the carboxyl groups and the number of the acid anhydride groups are approximately equal to the number of the epoxy groups contained in the bisepoxide. In general, it is preferred to adopt the above-mentioned ranges of the proportions in the practice of this invention.

The metal containing curable compositions in which the liquid rubber component has such ionic bonds according to this invention have an excellent curing property; and provide through curing reaction novel metal-containing ionic cured rubbers having excellent properties. The curing reaction proceeds rapidly generally at a temperature of from 40° C. to 200° C. and preferably from 60° C. to 160° C., although some compositions according to this invention are gradually cured even at room temperature. The curing reaction is considered to proceed by way of the following main reactions. The addition reaction (esterification reaction) of the carboxyl group with the epoxy group takes place to form ester linkage and hydroxyl group. Then, the addition of the acid anhydride group to the resulting hydroxyl group (semi-esterification reaction) takes place to form an ester linkage and a carboxyl group. Crosslinking reaction is considered to proceed by the alternate repeating of the above reactions. In the curing reaction of the present composition, a conventional esterification catalyst may be used if so desired. It has been found, however, that the metal-carboxylate group contained in the liquid rubber, which is a component of the curable composition, exhibits an excellent catalytic action on the curing reaction. Therefore, it is an important feature of this invention that the curing reaction proceeds smoothly without using any curing catalyst.

The metal-containing curable compositions may be incorporated with suitable amounts of fillers, pigments, diluents and the like, if desired.

The present invention provides, as mentioned above, an industrially advantageous process in which a novel and excellent metal-containing ionic cured rubber is produced in a single step without incorporating a catalyst, thus largely contributing to the art.

The present invention is further explained by way of the following examples which are not intended to restrict the invention, and variations and modifications may be made without departing from the spirit and scope of the invention. Incidentally, all the "parts" appearing in the examples are based on weight.

EXAMPLE 1

A curable composition was prepared by homogeneously mixing 58.92 parts of a partially neutralized product (neutralization degree 50%) which had been produced by partially neutralizing a carboxyl-terminated liquid polybutadiene (supplied by the B. F. Goodrich Company, U.S.A., Grade Hycar CTB 2000x162) with Mg++, 17.67 parts of hexahydrophthalic anhydride and 23.41 parts of bisphenol A diglycidyl ether. The composition was subjected to curing at 160° C. for 11 minutes to form a gel. By maintaining the composition at the same temperature for 3 hours, a tough metal-containing ionic cured rubber having elasticity was obtained. The rubber exhibited a tensile strength of 98 kg/cm², elongation of 59% and Shore A hardness of 95.

EXAMPLE 2

A curable composition was prepared by homogeneously mixing 58.96 parts of Hycar CTB 2000x162 which had been partially neutralized with Ca++ (neutralization degree 50%), 17.66 parts of hexahydrophthalic anhydride and 23.38 parts of bisphenol A diglycidyl ether. The composition was subjected to curing at 160° C. for 32 minutes to form a gel. By maintaining the composition at the same temperature for 5 hours, a tough metal-containing ionic cured rubber having elasticity was obtained. The rubber exhibited a tensile strength of 48 kg/cm$^2$, elongation of 83% and Shore A hardness of 80.

EXAMPLE 3

A curable composition was prepared by homogeneously mixing 51.62 parts of a partially neutralized product (neutralization degree 50%) which had been produced by partially neutralizing a carboxyl-terminated liquid butadiene-acrylonitrile copolymer (supplied by the Goodrich Company, Grade Hycar CTBN 1300x8) with Mg++, 20.81 parts of hexahydrophthalic anhydride and 27.57 parts of bisphenol A diglycidyl ether. The composition was subjected to curing at 160° C. for 14 minutes to form a gel. By maintaining the composition at the same temperature for 3 hours, a tough metal-containing ionic cured rubber having elasticity was obtained. The rubber exhibited a tensile strength of 166 kg/cm$^2$, elongation of 48% and Shore A hardness of more than 100.

EXAMPLE 4

A curable composition was prepared by homogeneously mixing 51.67 parts of partially neutralized Hycar CTBN 1300x8 with Ca++ (neutralization degree 50%), 20.97 parts of hexahydrophthalic anhydride and 27.54 parts of bisphenol A diglycidyl ether. The composition was subjected to curing at 160° C. for 21 minutes to form a gel. By maintaining the composition at the same temperature for 4 hours, a tough metal-containing ionic cured rubber having elasticity was obtained. The rubber exhibited a tensile strength of 120 kg/cm$^2$, elongation of 63% and Shore A hardness of more than 100.

EXAMPLE 5

A curable composition was prepared by homogeneously mixing 45.22 parts of a partially neutralized product (neutralization degree 50%) which had been produced by partially neutralizing a carboxyl-terminated butadiene-acrylonitrile copolymer (supplied by the Goodrich Company, Grade Hycar CTBNX 1300x9) with Mg++, 23.70 parts of hexahydrophthalic anhydride and 31.08 parts of bisphenol A diglycidyl ether. The composition was subjected to curing at 160° C. for 4 hours to give a tough metal-containing ionic cured rubber having elasticity. The rubber exhibited a tensile strength of 249 kg/cm$^2$, elongation of 34% and Shore A hardness of more than 100.

EXAMPLE 6

A curable composition was prepared by homogeneously mixing 45.28 parts of partially neutralized Hycar CTBNX 1300x9 with CA++, 23.68 parts of hexahydrophthalic anhydride and 31.04 parts of bisphenol A diglycidyl ether. The composition was subjected to curing at 160° C. for 5 hours to give a tough metal-containing ionic cured rubber having elasticity. The rubber exhibited a tensile strength of 178 kg/cm$^2$, elongation of 45% and Shore A hardness of more than 100.

COMPARATIVE EXAMPLE

A composition was prepared by homogeneously mixing 57.64 parts of Hycar CTB 2000x162 which had been neutralized at all, i.e. liquid rubber containing no metal, instead of the afore-mentioned partially neutralized liquid rubbers, 17.33 parts of hexahydrophthalic anhydride and 25.03 parts of bisphenol A diglycidyl ether. The curing reaction of the composition scarcely proceeded even at a temperature as high as 160° C. since the composition did not contain any metal carboxylate group. Then the composition was incorporated with N,N-dimethylbenzylamine (0.15% by weight of the bisepoxide) as a catalyst and heated to 160° C. for 5 hours. The curing reaction thereof proceeded sufficiently. The resulting cured rubber, however, exhibited a tensile strength of 17 kg/cm$^2$ and was very inferior in physical properties.

It is clearly shown from the above results that the metal carboxylate groups in a curable composition exhibit excellent catalytic action in the curing reaction according to this invention.

Moreover, it should be noted that all the metal-containing cured rubbers having ionic bonds which were obtained in the above examples are novel and that the physical properties thereof are remarkably improved by the introduction of the metals (ionic bonds) into the rubbers.

What is claimed is:

1. A process for producing a novel metal-containing cured rubber having ionic bonds; which comprises reacting a partially neutralized liquid rubber which has been prepared by partial neutralization, with metal ion, of a liquid rubber selected from the group consisting of a carboxyl-terminated liquid polybutadiene, a carboxyl-terminated butadiene-acrylonitrile copolymer, the above mentioned polymer or copolymer having additional carboxyl group on its side chain and mixtures thereof, with a bisepoxide and a dibasic acid anhydride.

2. The process according to claim 1, wherein the metal ions are selected from the group consisting of Mg++, Ca++, Zn++ and mixtures thereof.

3. The process according to claim 1, wherein the neutralization degree of the carboxyl groups in the liquid rubber with the metal ions is in the range of from 20 to 50%.

4. The process according to claim 1, wherein the bisepoxide is selected from the group consisting of bisphenol A diglycidyl ether, phthalic acid diglycidyl ester and hexahydrophthalic acid diglycidyl ester.

5. The process according to claim 1, wherein the dibasic acid anhydride is selected from the group consisting of phthalic anhydride, maleic anhydride, hexahydrophthalic anhydride and succinic anhydride.

6. The process according to claim 1, wherein the molar ratio of the liquid rubber to the dibasic acid anhydride is in the range of from 1:5 to 1:40 and the total of the number of the carboxyl groups contained in the liquid rubber and the number of the acid anhydride groups is approximately equal to the number of the epoxy groups contained in the bisepoxide.

7. The process according to claim 6, wherein the bisepoxide is partly replaced with triepoxide.

* * * * *